(12) United States Patent
Chinthu et al.

(10) Patent No.: US 12,525,287 B2
(45) Date of Patent: Jan. 13, 2026

(54) HIGH VOLTAGE COLUMN MULTIPLEXOR

(71) Applicant: GlobalFoundries U.S. Inc., Malta, NY (US)

(72) Inventors: Siva Kumar Chinthu, Bangalore (IN); Suresh Pasupula, Bangalore (IN); Sheikh Sabiq Chishti, Manipur (IN); Palle Sundar Veerendranath, Bangalore (IN); Sreedevi Bindu, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 210 days.

(21) Appl. No.: 18/423,542

(22) Filed: Jan. 26, 2024

(65) Prior Publication Data

US 2025/0246235 A1 Jul. 31, 2025

(51) Int. Cl.
G11C 13/00 (2006.01)

(52) U.S. Cl.
CPC ........ G11C 13/0026 (2013.01); G11C 13/004 (2013.01); G11C 13/0069 (2013.01); G11C 13/0097 (2013.01)

(58) Field of Classification Search
CPC .............. G11C 13/0026; G11C 13/004; G11C 13/0069; G11C 13/0097

USPC .......................................................... 365/148
See application file for complete search history.

(56) References Cited

U.S. PATENT DOCUMENTS

| | | | |
|---|---|---|---|
| 8,773,911 B2 * | 7/2014 | Park ................... | G11C 16/0483 365/185.24 |
| 2018/0262197 A1 | 9/2018 | Gaillardon et al. | |
| 2021/0174868 A1 | 6/2021 | Mueller et al. | |
| 2021/0201994 A1 | 7/2021 | Chou et al. | |

* cited by examiner

*Primary Examiner* — Fernando Hidalgo
(74) *Attorney, Agent, or Firm* — David Cain; Hoffman Warnick LLC

(57) ABSTRACT

A multiplexing circuit for a memory, including: a first parallel branch for coupling a program voltage to a first bitline corresponding to a first bit cell of the memory during a program mode of the memory; and a second parallel branch for coupling a program inhibit voltage to a plurality of additional bitlines corresponding to a plurality of additional bit cells of the memory during a program inhibit mode of the memory, wherein the first parallel branch couples an erase inhibit voltage to the plurality of additional bitlines during an erase inhibit mode of the memory, and wherein the second parallel branch couples an erase voltage to the first bitline during an erase mode of the memory.

17 Claims, 12 Drawing Sheets

| PGM | ERS | ANS | DIN | HV_AN (V) | IO (V) | IO_ERS (V) | HV_AN_H (V) | HV_AN_L (V) | OPERATION |
|---|---|---|---|---|---|---|---|---|---|
| 0 | 0 | X | X | 0 | FLOAT | FLOAT | 0 | 0 | READ |
| 1 | 0 | 1 | 1 | VWR | FLOAT | VWR | 0 | FLOAT | Program inhibit of selected ANODE DRIVER bit cells |
| 1 | 0 | 1 | 0 | VWR | 0 | FLOAT | VWR | FLOAT | Program |
| 1 | 0 | 0 | X | 0 | 0 | FLOAT | VPROTECT_vwr | 0 | Program inhibit of unselected ANODE DRIVER bit cells |
| 0 | 1 | X | 1 | 0 | FLOAT | VWR | VPROTECT_vwr | 0 | Erase |
| 0 | 1 | X | 0 | 0 | 0 | FLOAT | VPROTECT_vwr | 0 | Erase inhibit |

FIG. 2

| VWR (V) | VPROTECT_vwr | VPRT0 (V) |
|---|---|---|
| 1.2 – 1.8 | 0 | 0.8 |
| 1.8 – 2.6 | 0.8 | 1.8 (VDDW) |
| 2.6 – 3.0 | 1.3 | 1.8 (VDDW) |
| 3.0 – 3.6 | 1.8 (VDDW) | 1.8 (VDDW) |

FIG. 4

| Program Mode | YMSEL | YMSELB | MSEL | MSELB | YLSEL | YLSELB | LSEL | LSELB | HV_AN_H | IO_ERS | HV_AN_L | IO | BL |
|---|---|---|---|---|---|---|---|---|---|---|---|---|---|
| Sel BL | VDDW | VWR | VDDW | 0 | VDDW | VWR | VDDW | 0 | VWR | FLOAT | FLOAT | 0 | 0 |
| Prog. Inhibit | VDDW | VWR | VDDW | 0 | VWR | VDDW | 0 | VDDW | VWR | FLOAT | FLOAT | 0 | VWR |

FIG. 7

| Erase Mode | YMSEL | YMSELB | MSEL | MSELB | YLSEL | YLSELB | LSEL | LSELB | HV_AN_H | IO_ERS | HV_AN_L | IO | BL |
|---|---|---|---|---|---|---|---|---|---|---|---|---|---|
| Sel BL | VDDW | VWR | VDDW | 0 | VDDW | VWR | VDDW | 0 | VDDW | VWR | 0 | FLOAT | VWR |
| Erase Inhibit | VDDW | VWR | VDDW | 0 | VWR | VDDW | 0 | VDDW | VDDW | VWR | 0 | FLOAT | 0 |

FIG. 10

| Read Mode | YMSEL | YMSELB | MSEL | MSELB | YLSEL | YLSELB | LSEL | LSELB | HV_AN_H | IO_ERS | HV_AN_L | IO | BL |
|---|---|---|---|---|---|---|---|---|---|---|---|---|---|
| Sel BL | 0 | VDDW | VDDW | 0 | 0 | VDDW | VDDW | 0 | 0 | FLOAT | 0 | Vcasc-Vth | Vcasc-Vth |
| Read Inhibit | 0 | VDDW | 0 | VDDW | VDDW | 0 | 0 | VDDW | VDDW | FLOAT | 0 | FLOAT | 0 |

FIG. 13

HIGH VOLTAGE COLUMN MULTIPLEXOR

BACKGROUND

The present disclosure relates to integrated circuits (ICs) and, more particularly, to embodiments of a high voltage column multiplexor with low voltage devices for a resistive random access memory (RRAM).

RRAM is an emerging technology for next generation non-volatile memory devices due to its enhanced properties such as fast operation speed, simple device structure, low power consumption, and good scalability potential. RRAM is a memory structure including an array of memory (bit) cells each of which stores a bit of data using resistance values, rather than electronic charge. Particularly, each bit cell in an RRAM includes a resistive material layer, the resistance of which can be adjusted to represent logic "0" or logic "1." Bit cells in an RRAM operate under the principle that a dielectric, which is normally insulating, can be made to conduct through a filament or conduction path formed after the application of a forming or programming voltage. The forming of a filament or conduction path is the forming process or forming operation of the RRAM.

After the forming process, one or more filament conductors are disposed across the resistive material layer. During a writing (programming) process, the filament conductors may be broken by applying a first writing voltage to the bit cell of an RRAM. After the filament conductors are broken, the resistance across the resistive material layer is at a high value and a low current or no current may be passed. A subsequent writing process may apply a second writing voltage to reconnect the broken filament conductors. By changing the filament conductors, a high or low resistance is stored in the bit cell that does not change when the power is removed.

RRAM-based memories suffer from parasitic leakage currents, mainly during programming. Leakage currents are unwanted currents which flow through bit cells which are not currently being programmed while other bit cells are being programmed. Leakage currents occur when a voltage is applied to a conductive path such as a word line which is connected to both the programmed bit cells and the non-programmed bit cells. A high leakage current has a number of negative effects, including increased power consumption, reduced accuracy of read operations, and limited programming rate and the type of programming sequence.

Various multiplexing circuits (e.g., a column multiplexor) including a plurality of semiconductor devices (e.g., transistors) may be used to access a bit cell in an RRAM during programming, erase, and read operations. Currently, such multiplexors often include a plurality of high power devices (e.g., 3.6 V) and/or a plurality of low power devices (e.g., 1.8 V). Unfortunately, the low power devices may operate outside of their safe operating area (SOA), which may damage or degrade the operation of the low power devices and lead to increased leakage currents. In addition, additional circuitry may be required to address the stressed devices operating outside of their SOA.

SUMMARY

The illustrative aspects of the present disclosure are designed to solve the problems herein described and/or other problems not discussed.

Embodiments of the disclosure provide a multiplexing circuit for a memory, including: a first parallel branch for coupling a program voltage to a first bitline corresponding to a first bit cell of the memory during a program mode of the memory; and a second parallel branch for coupling a program inhibit voltage to a plurality of additional bitlines corresponding to a plurality of additional bit cells of the memory during a program inhibit mode of the memory, wherein the first parallel branch further couples an erase inhibit voltage to the plurality of additional bitlines during an erase inhibit mode of the memory, and wherein the second parallel branch further couples an erase voltage to the first bitline during an erase mode of the memory.

Other embodiments of the disclosure provide a multiplexing circuit for a memory, including: a first parallel branch including a plurality of N-type field effect transistors (NFETs), wherein the first parallel branch: couples a program voltage to a bitline corresponding to a bit cell of the memory during a program mode of the memory; and couples a sense amplifier to the bitline during a read mode of the memory; and a second parallel branch coupling an erase voltage to the bitline during an erase mode of the memory, wherein the second parallel branch includes a plurality of NFETs and a plurality of P-type FETs (PFETs).

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 2 depicts a table summarizing the operation of the column multiplexor of FIG. 1 during programming, erase, and read operations according to embodiments of the disclosure.

FIG. 4 depicts a table listing the voltages VPROTECT_vwr and VPRTO_vwr for different ranges of write supply voltages according to embodiments of the disclosure.

FIG. 7 depicts a table listing the voltages for the YMUX of FIG. 3 during programming and inhibiting of programming according to embodiments of the disclosure.

FIG. 10 depicts a table listing the voltages for the YMUX of FIG. 3 during erasing and inhibiting of erasing according to embodiments of the disclosure.

FIG. 13 depicts a table listing the voltages for the YMUX of FIG. 3 during reading and inhibiting of reading of bit cells according to embodiments of the disclosure.

Figure 1:
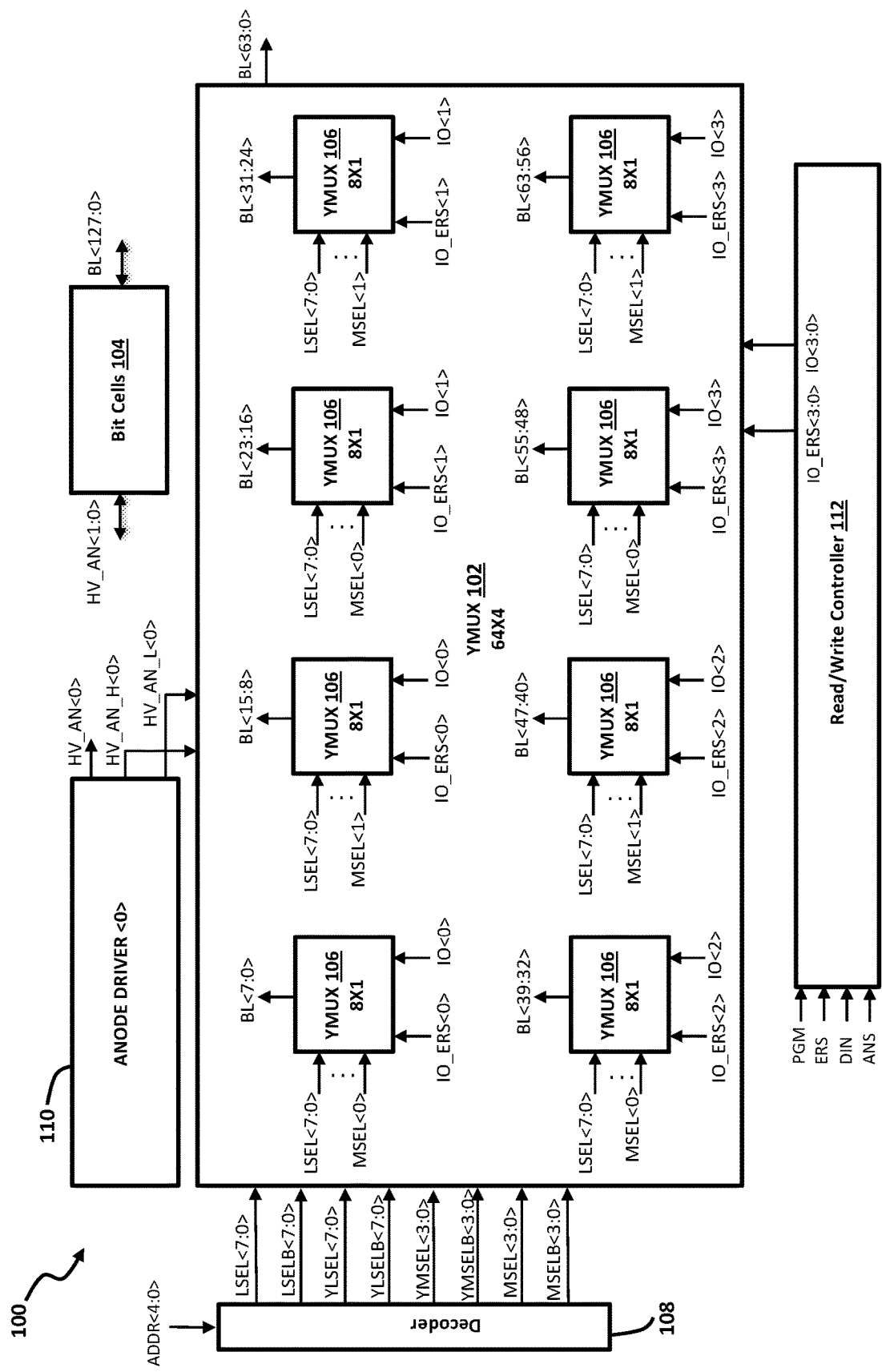
FIG. 1 depicts a portion of a resistive random access memory (RRAM) including a 64×4 column multiplexor for selectively accessing the bit cells of the RRAM according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

As mentioned above, various multiplexing circuits (e.g., a column multiplexor) including a plurality of semiconductor devices (e.g., transistors) may be used to access a bit cell in an RRAM during programming, erase, and read operations. Currently, such multiplexors often include a plurality of high power devices (e.g., 3.6 V) and/or a plurality of low power devices (e.g., 1.8 V). Unfortunately, the low power devices may operate outside of their safe operating area (SOA), which may damage or degrade the operation of the low power devices and lead to increased leakage currents. In addition, additional circuitry may be required to address the stressed devices operating outside of their SOA.

FIG. 1 depicts a portion of a resistive random access memory (RRAM) 100 including a 64×4 column multiplexor 102 (hereafter YMUX 102) for selectively accessing the bit cells 104 of the RRAM 100 via bitlines (BL)<63:0>. As shown, the YMUX 102 includes a plurality of 8×1 column multiplexors 106 (hereafter YMUXs 106). In this example, 5-bit (low voltage) address decoding and 5-bit (high voltage) address decoding are provided by a decoder 108 for ADDR<4:0>. For example, during 5-bit (low voltage) address decoding, ADDR<1:0> is decoded to MSEL<3:0>/MSELB<3:0> and ADDR<4:2> is decoded to LSEL<7:0>/LSELB<7:0>. During 5-bit (high voltage) address decoding, ADDR<1:0> is decoded to YMSEL<3:0>/YMSELB<3:0> and ADDR<4:2> is decoded to YLSEL<7:0>/YLSELB<7:0>. An anode driver 110 (anode driver <0>) drives 64-bit lines (BL<0> to BL<63>), which are grouped with 4 IOs (IO<0> to IO<3>). A corresponding structure (not shown), including an anode driver (anode driver <1>) and a 64×4 YMUX formed of a plurality of 8×1 YMUXs, is provided for selectively accessing bit cells 104 of the RRAM 100 via a further 64-bit lines (BL<64> to BL<127>). A read/write controller 112 controls the reading/writing of data to/from the bit cells 104 via IO<3:0> and IO_ERS<3:0>. Control signals PGM (program), ERS (erase), DIN (input data), and ANS (anode driver selection) are provided to the read/write controller 112.

FIG. 2 depicts a table summarizing the operation of the YMUX 102 (and YMUXs 106) of FIG. 1 during program, erase, and read operations according to embodiments of the disclosure. In the table, VWR is the write supply voltage (e.g., 1.2 V to 3.6 V) and VPROTECT_vwr is a protection voltage (low power supply). The table in FIG. 2 also summarizes the operation of the YMUX 102 (and YMUXs 106) during program inhibit of selected anode driver bit cells, program inhibit of unselected anode driver bit cells, and erase inhibit. Bit cells coupled to an unselected anode driver are inhibited by 0V. During read operations, the IOs are connected to a sense amplifier (not shown).

Figure 3:
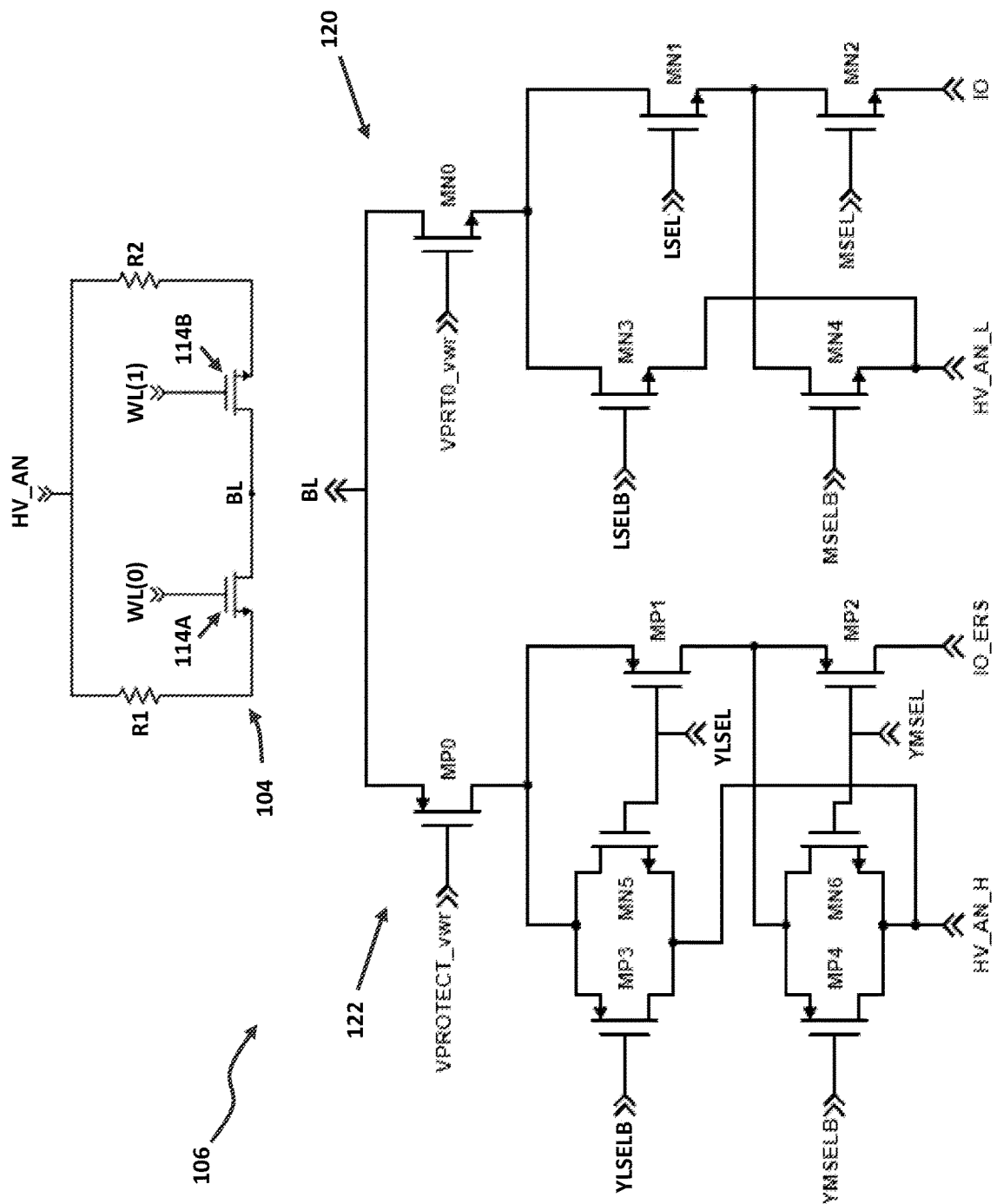
FIG. 3 depicts an 8×1 column multiplexor (YMUX) according to embodiments of the disclosure.

FIG. 3 depicts a YMUX 106 and a bit cell 104 of the RRAM 100 according to embodiments of the disclosure. As shown, the bit cell 104 includes a first NFET 114A, gated by a write line (WL (0)), a second NFET 114B, gated by a write line (WL (1)), and RRAM elements represented by resistors R1 and R2. A supply voltage HV_AN is provided to the bit cell 104 by an anode driver 110.

The YMUX 106 may include one or more transistors including P-type transistors and/or N-type transistors. For purposes of illustration, the P-type transistors and N-type transistors are described below and illustrated in the figures as being metal oxide semiconductor field effect transistors (MOSFETs) and, particularly, P-type field effect transistors (PFETs) and N-type field effect transistors (NFETs), respectively. In FIG. 3, for example, the YMUX 106 includes first and second parallel branches 120, 122. The first parallel branch 120 of the YMUX 106 includes a plurality of NFETs MN0-MN4. The second parallel branch 122 of the YMUX 106 includes a plurality of PFETs MP0-MP4 and a pair of NFETs MN5 and MN6.

A MOSFET refers to a transistor with a semiconductor channel region positioned laterally between a source region and a drain region and with a gate (e.g., including a gate dielectric-gate conductor stack) adjacent to the channel region. However, it should be understood that the figures and discussion thereof are not intended to be limiting. For example, alternatively, a similar circuit structure could be formed using bipolar junction transistors (BJTs) and, particularly, PNP BJTs and NPN BJTs. The transistors may, for example, all have the same maximum voltage rating, and, for reduced power consumption, the maximum voltage rating can be relatively low as specified by the transistor data sheet. For example, the transistors can have a maximum voltage rating of 3.3V or lower. In some embodiments, the transistors can have a maximum voltage rating of 1.8V, 1.5V or 0.8V. To reduce manufacturing complexity, the transistors may also all be symmetric. That is, they can be designed so that the source region and the drain region are the same (e.g., same size, doping, etc.) except for minor process variations and so that the same maximum voltage rating applies to the gate to source voltage (VGS), the gate to drain voltage (VGD), and the source to drain voltage (VSD). As discussed in greater detail below, each MUX 106 may specifically be configured to allow operation of the MUX 106 without violating any of these maximum voltage ratings in order to avoid device stress and ensure continuous operation within the SOA.

In the first parallel branch 120 of the YMUX 106, the gate of the NFET MN0 is coupled to a voltage VPRTO_vwr. The drain of the NFET MN0 is coupled to the bitline BL of the bit cell 104. The source of the NFET MN0 is coupled to the drains of the NFETs MN1 and MN3. The gates of the NFETs MN1 and MN3 are coupled to the voltages LSEL and LSELB, respectively. The source of the NFET MN3 is coupled to the source of the NFET MN4 and to an erase voltage HV_AN_L (hereafter "voltage HV_AN_L") provided by an anode driver 110. The source of the NFET MN1 is coupled to the drains of the NFETs MN2 and MN4. The gates of the NFETS MN2 and MN4 are coupled to the voltages MSEL and MSELB, respectively. The source of the NFET MN2 is coupled to a program voltage IO (hereafter "voltage IO").

In the second parallel branch 122 of the YMUX 106, the gate of the PFET MP0 is coupled to a voltage VPROTECT_vwr. The source of the PFET MP0 is coupled to the bitline BL of the bit cell 104. The drain of the PFET MP0 is coupled to the sources of the PFETs MP1 and MP3 and to the drain of the NFET MN5. The gates of the PFET MP1 and the NFET MN5 are coupled to the voltage YLSEL. The gate of the PFET MP3 is coupled to the voltage YLSELB. The drain of the PFET MP3 and the source of the NFET MN5 are coupled to the drain of the PFET MP4, the source of the NFET MN6, and a program inhibit voltage HV_AN_H (hereafter "voltage HV_AN_H") provided by an anode driver 110. The drain of the PFET MP1 is coupled to the sources of the PFETs MP2 and MP4 and the drain of the NFET MN6. The gates of the PFET MP2 and the NFET MN6 are coupled to the voltage YMSEL. The gate of the PFET MP4 is coupled to the voltage YMSELB. The drain of the PFET MP2 is coupled to an erase inhibit voltage IO_ERS (hereafter "voltage IO_ERS"). The various voltages in the YMUX 106 may be provided, for example, using programmable voltage supplies (e.g., 1.2 V to 3.6 V, with a step size of 50 mV) or other suitable circuitry.

As detailed above, VWR is the write supply voltage (e.g., 1.2 V to 3.6 V) and VPROTECT_vwr is a protection voltage (low power supply). The voltage VPRO_vwr may also be referred to as a protection voltage (low power supply). The table depicted in FIG. 4 lists the voltages VPROTECT_vwr and VPRTO_vwr for different ranges of write supply voltages. The voltage VDDW is a fixed voltage, which may be set at a voltage level (e.g., 1.8 V) equal to the maximum voltage rating of the FETs in FIG. 3. In the following discussion, it is assumed that the write supply voltage VWR is 3.6 V. To this extent, according to the table in FIG. 4, the voltages VPROTECT_vwr and VPRTO_vwr are set to VDDW=1.8 V.

Figure 5:
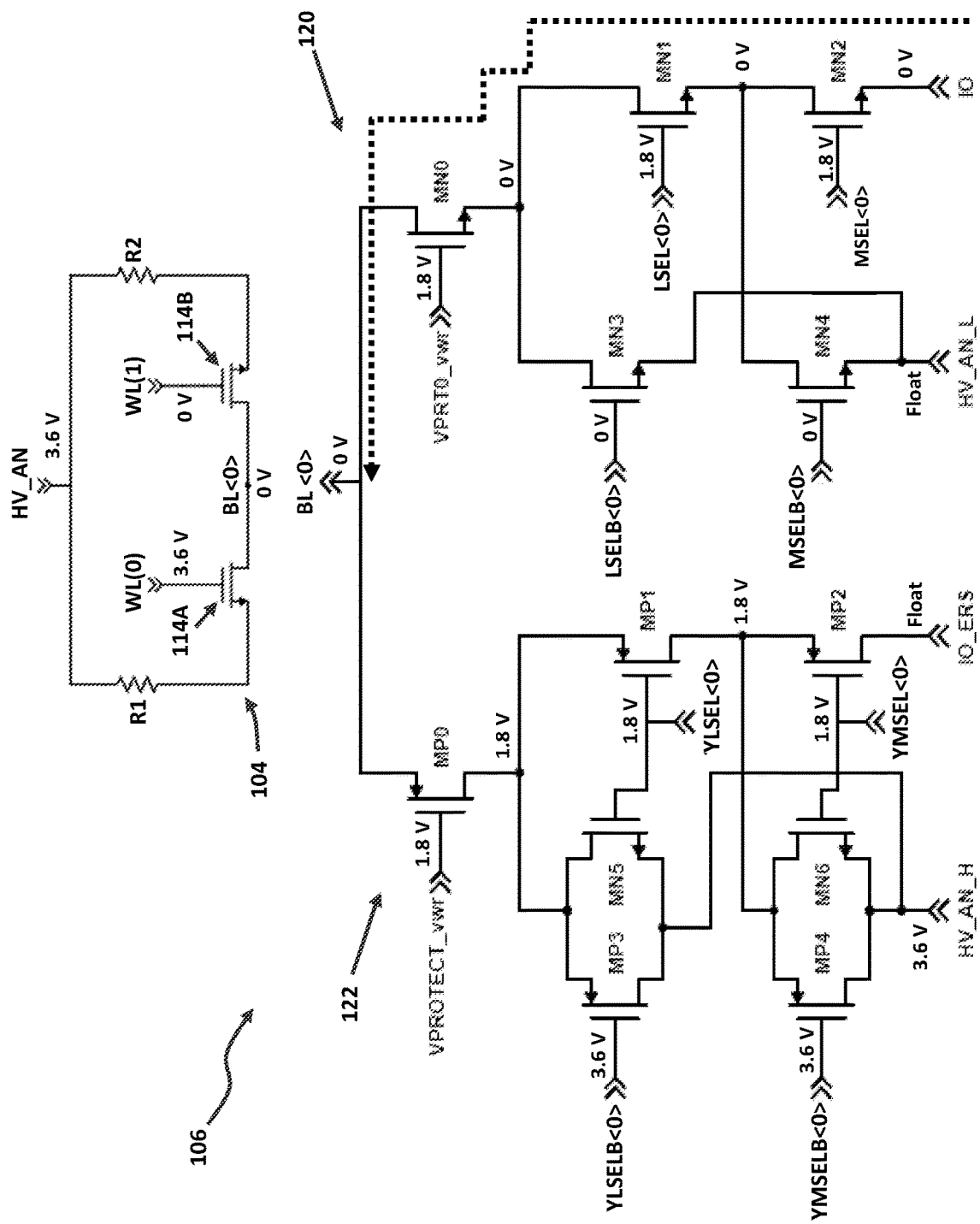
FIG. 5 depicts the YMUX of FIG. 3 during the programming of a bit cell corresponding to a selected bitline according to embodiments of the disclosure.
Figure 6:
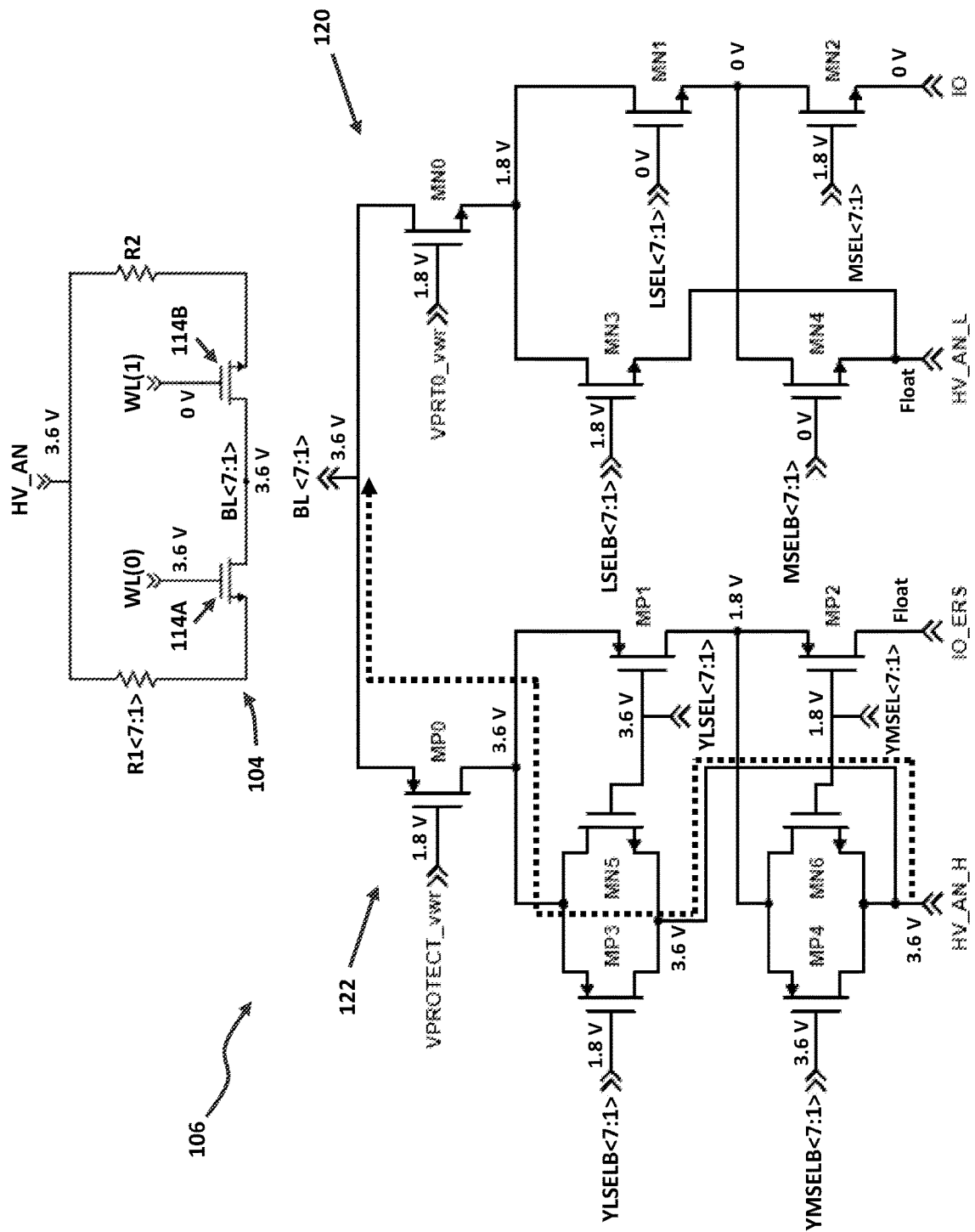
FIG. 6 depicts the YMUX of FIG. 3 during the inhibiting of the programming of bit cells according to embodiments of the disclosure.

In the example shown in FIGS. 5 and 6, the YMUX 106 is assumed to be associated with the bitcells 104 corresponding to bitlines BL<7:0> (see FIG. 1). In FIG. 5, the bit cell 104 of the YMUX 106 corresponding to the bitline BL<0> is selected and is being programmed. In FIG. 6, the bit cells 104 of the YMUX 106 corresponding to bitlines BL<7:1> are prohibited from being programmed. In FIGS. 5 and 6, it is assumed that HV_AN=HV_AN_H=VWR=3.6 V and HV_AN_L is floating. Further, when DIN=0, then IO=0V and IO_ERS is floating. When VWR=3.6 V, then VPROTECT_vwr=VPRTO_vwr=VDDW=1.8 V. FIG. 7 depicts a table listing the various voltages applied to the FETs in the YMUX 106 under different programing modes.

Based on the voltages shown in FIG. 5 and listed in FIG. 7, the NFETs MN0, MN1, and MN2 in the first parallel branch 120 of the YMUX 106 are on, creating a conductive NMOS path as indicated by the dashed line in FIG. 5 from the source of the NFET MN2 (and voltage IO) to the drain of the NFET MN0 and the drains of the NFETs 114A, 114B of the bit cell 104. As such, with the bitline BL<0>=IO=0 V, the NFET 114A is on, thereby programming the RRAM element R1 in the bit cell 104. To this extent, the first parallel branch 120 of the YMUX 106 couples the IO voltage to the bitline BL<0>. Examining the second parallel branch 122 of the YMUX in FIG. 5, it can be seen that the PFETs MP0-MP4 and the NFETs MN5 and MN6 are off, effectively decoupling the second parallel branch 122 of the YMUX 106 from the bitline BL<0>.

In FIG. 6, programming of the bit cells 104 corresponding to the unselected bitlines BL<7:1> of the YMUX 106 is inhibited. Based on the voltages shown in FIG. 6 and listed in FIG. 7, the NFETs MN0-MN4 in the first parallel branch 120 of the YMUX 106 are off. However, in the second parallel branch 122 of the YMUX, the PFETs MP3 and MP0 are on, creating a conductive path from the voltage HV_AN_H (VWR=3.6 V) to the source of the PFET MP0 and the bitlines BL<7:1>, thereby preventing the programming of the corresponding bit cells 104.

Figure 8:
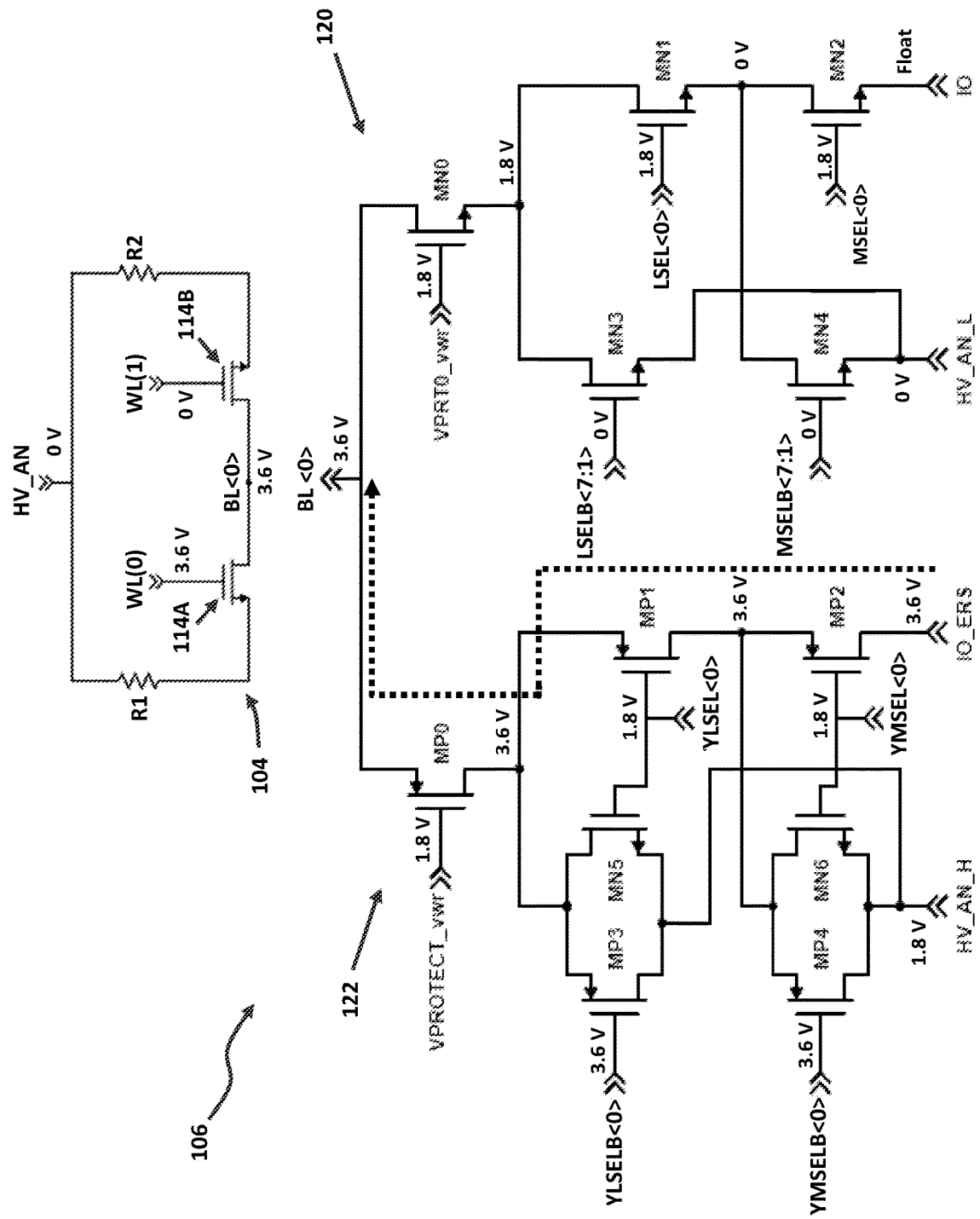
FIG. 8 depicts the YMUX of FIG. 3 during the erasing of a bit cell corresponding to a selected bitline according to embodiments of the disclosure.
Figure 9:
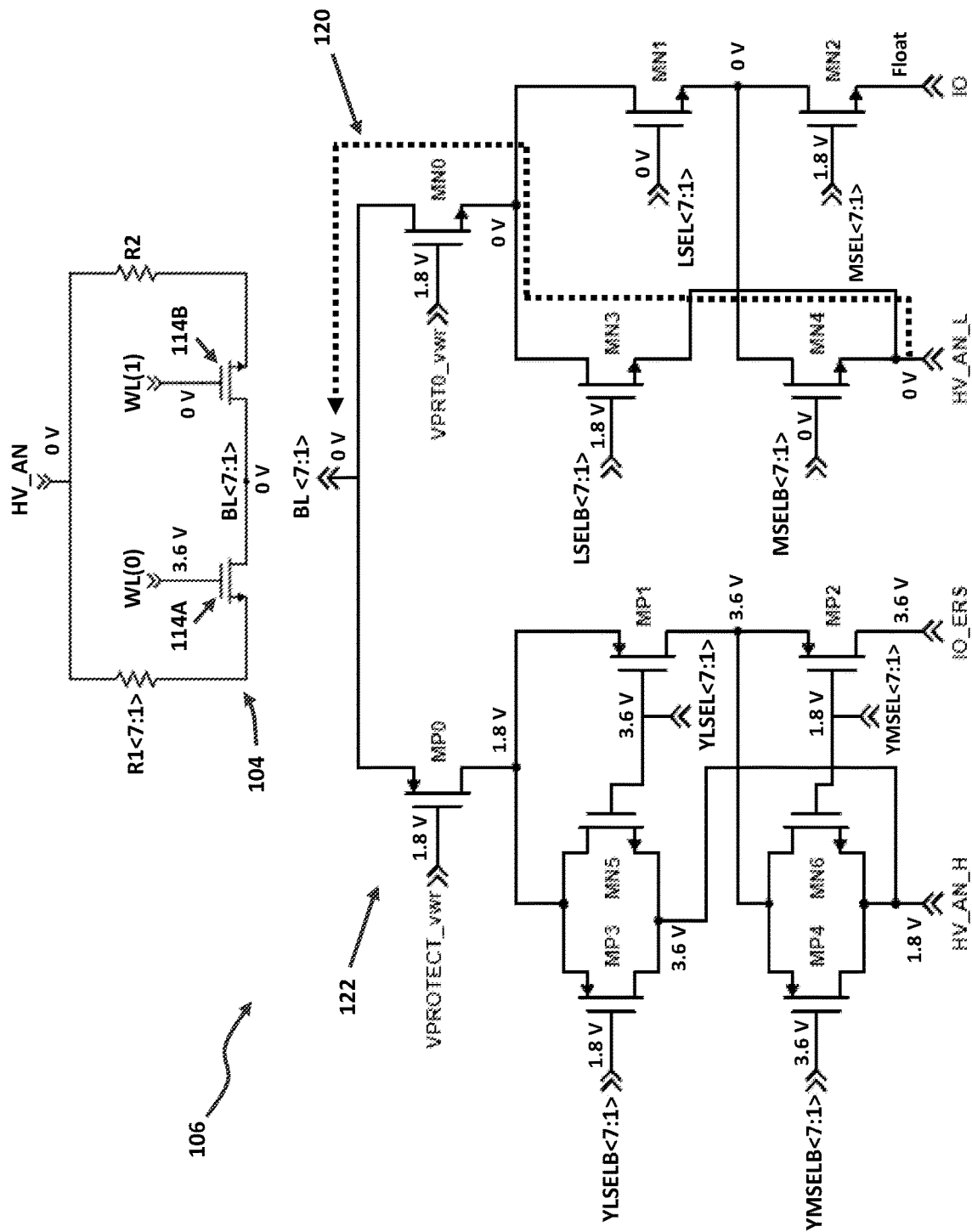
FIG. 9 depicts the YMUX of FIG. 3 during the inhibiting of the erasing of bit cells according to embodiments of the disclosure.

In the example shown in FIGS. 8 and 9, the YMUX 106 is again assumed to be associated with the bit cells 104 corresponding to bitlines BL<7:0> (see FIG. 1). In FIG. 8, the bit cell 104 of the YMUX 106 corresponding to the bitline BL<0> is selected and is being erased. In FIG. 9, the bit cells 104 of the YMUX 106 corresponding to bitlines BL<7:1> are prohibited from being erased. In FIGS. 8 and 9, it is assumed that HV_AN=HV_AN_L=0 V and HV_AN_H=VDDW=1.8 V. Further, when DIN=1, then IO is floating and IO_ERS=VWR=3.6 V. When VWR=3.6 V, then VPROTECT_vwr=VPT0_vwr=VDDW=1.8 V. FIG. 10 depicts a table listing the various voltages applied to the FETs in the YMUX 106 under different erase modes.

Based on the voltages shown in FIG. 8 and listed in FIG. 10, the NFETs MN0-NM4 in the first parallel branch 120 of the YMUX 106 are off, decoupling the first parallel branch 120 of the YMUX 106 from the bitline BL<0>. Examining the second parallel branch 122 of the YMUX 106 in FIG. 8, it can be seen that the PFETs MP0, MP1, and MP2 are on, creating a conductive PMOS path as indicated by the dashed line in FIG. 8 from the voltage IO_ERS=3.6 V to the source of the PFET MP0 and the drains of the NFETs 114A, 114B of the bit cell 104. As such, with the bitline BL<0>=IO_ERS=3.6 V, the RRAM element R1 in the bit cell 104 is erased. To this extent, the second parallel branch 122 of the YMUX 106 couples the IO_ERS voltage to the bitline BL<0>.

In FIG. 9, erasure of the bit cells 104 corresponding to the unselected bitlines BL<7:1> of the YMUX 106 is inhibited. Based on the voltages shown in FIG. 9 and listed in FIG. 10, the PFETs PN0-PN4 in the second parallel branch 122 of the YMUX 106 are off. However, in the first parallel branch 120 of the YMUX 106, the NFETs MN3 and MN0 are on, creating a conductive path from the voltage HV_AN_L=0 V to the drain of the NFET MN0 and the bitlines BL<7:1>, thereby preventing the erasure of the bit cells 104 corresponding to the bitlines BL<7:1>.

Figure 11:
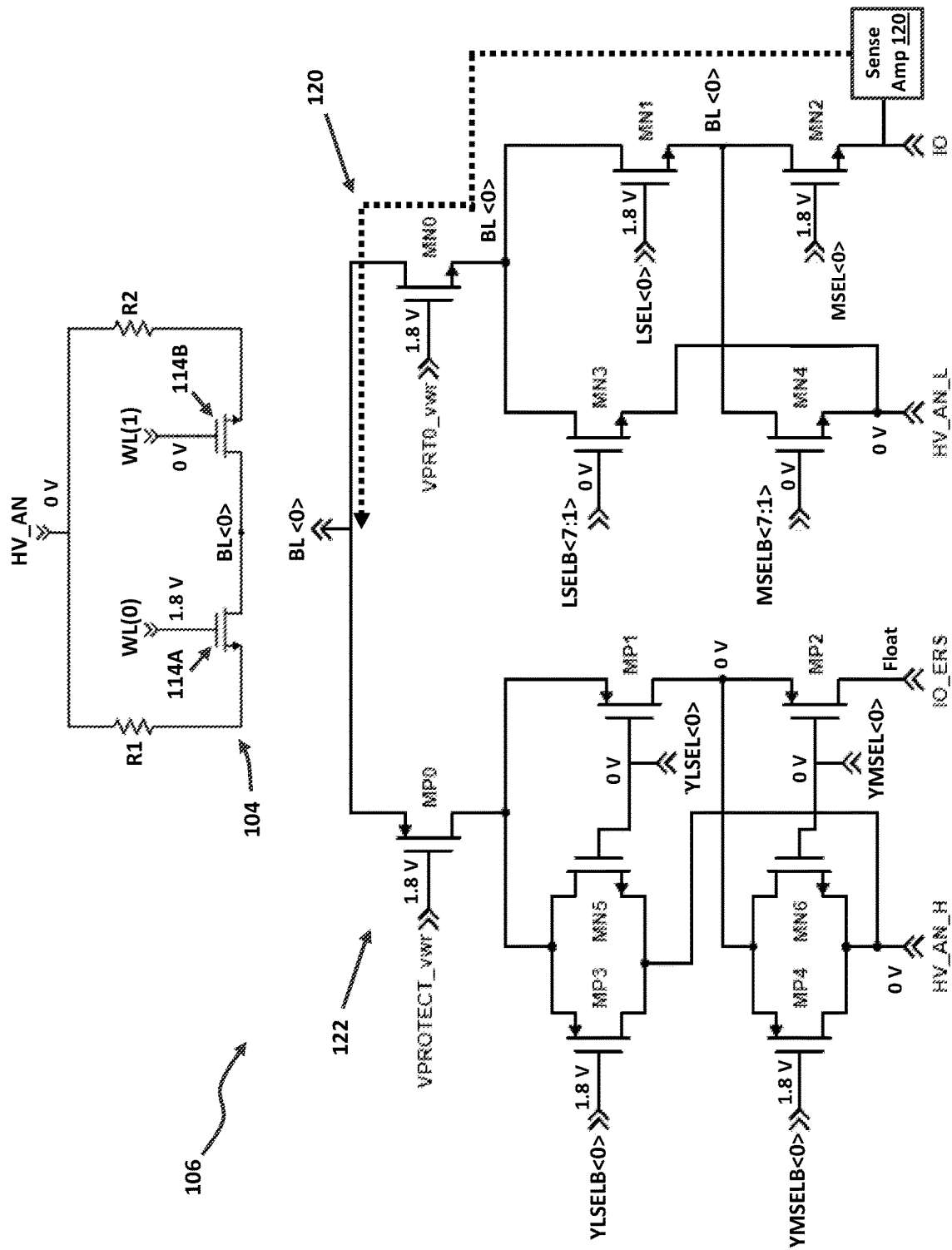
FIG. 11 depicts the YMUX of FIG. 3 during the reading of a bit cell corresponding to a selected bitline according to embodiments of the disclosure.
Figure 12:
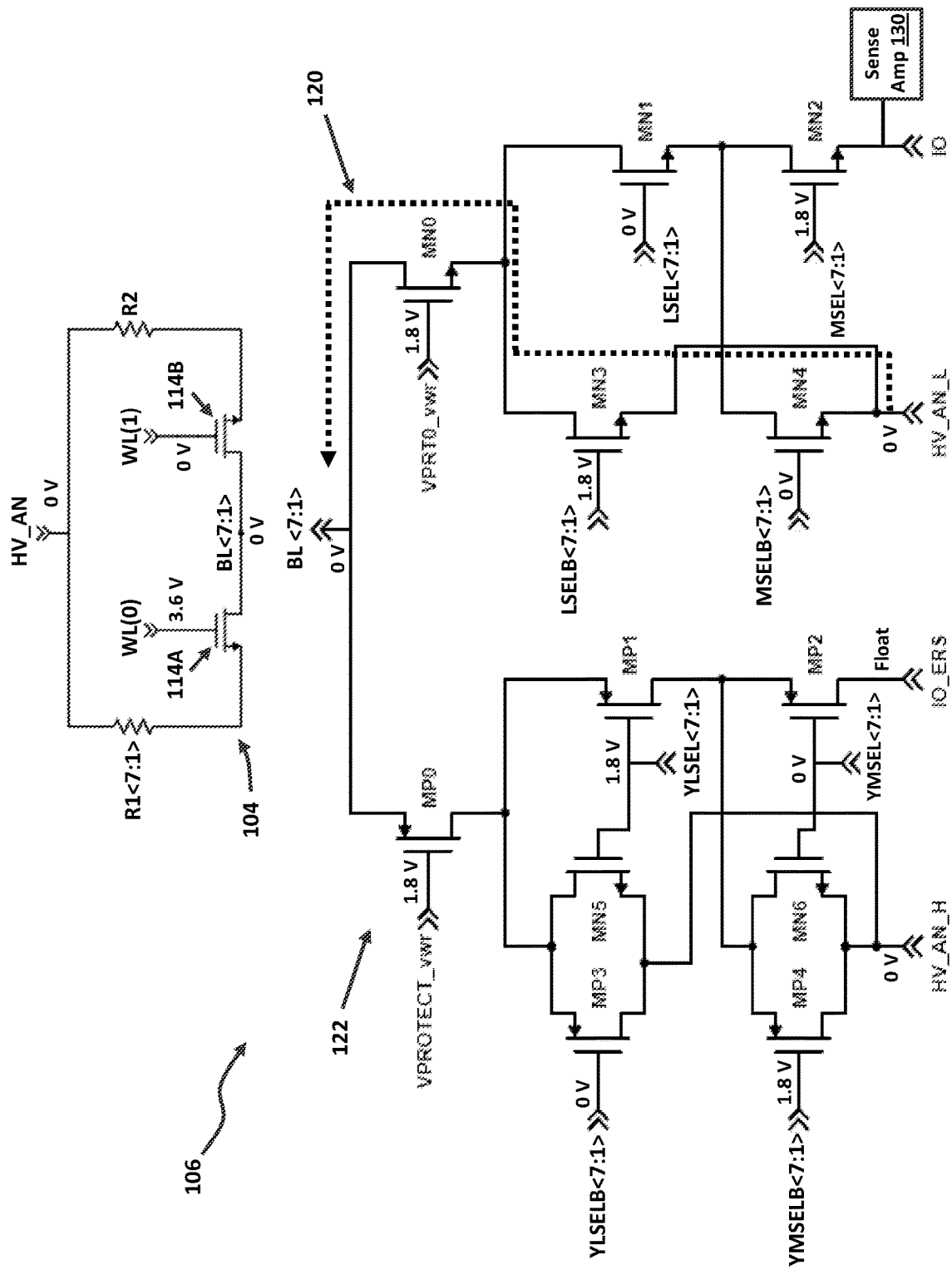
FIG. 12 depicts the YMUX of FIG. 3 during the inhibiting of the reading of bit cells according to embodiments of the disclosure.

FIGS. 11 and 12 depict the YMUX 106 during a reading mode according to embodiments of the disclosure. FIG. 13 depicts a table listing the various voltages applied to the FETs in the YMUX 106 under different reading modes.

In the example shown in FIGS. 11 and 12, the YMUX 106 is once again assumed to be associated with the bit cells 104 corresponding to bitlines BL<7:0> (see FIG. 1). In FIG. 11, the bit cell 104 of the YMUX 106 corresponding to the bitline BL<0> is selected and is being read. In FIG. 12, the bit cells 104 of the YMUX 106 corresponding to bitlines BL<7:1> are prohibited from being read. In FIGS. 11 and 12, it is assumed that HV_AN=HV_AN_H=HV_AN_L=0 V. Further, VPROTECT_vwr=VPT0_vwr=VDDW=1.8 V and IO_ERS is floating. A sense amplifier 130 is couped to the IO.

Based on the voltages shown in FIG. 11 and listed in FIG. 13, the NFETs MN0, MN1, and MN2 in the first parallel branch 120 of the YMUX 106 are on during the read mode, creating a conductive NMOS path as indicated by the dashed line in FIG. 11 from the sense amplifier 130 to the drain of the NFET MN0 and the drains of the NFETs 114A, 114B of the bit cell 104 (e.g., to bitline BL<0>). As such, the first parallel branch 120 of the YMUX 106 couples the sense amplifier 130 to the bitline BL<0>. The voltage at the bitline BL<0> is a voltage VCASC minus the threshold voltage Vth (e.g., VCASC-Vth), where VCASC is a reference voltage (e.g., 0.7 V) for controlling the voltage/current of the bit cell 104 during the read mode. In the second parallel branch 122 of the YMUX 106, the PFETs MP0-MP4 and the NFETs MN5 and MN6 are off. In FIG. 12, the NFETs MN0, MN3, and MN4 are on, creating a conductive NFET path as indicated by the dashed line in FIG. 12 from the voltage HV_AN_L (e.g., 0 V) to the unselected bitlines BL<7:1>, thereby inhibiting the reading of the corresponding bit cells 104. The voltages shown in FIGS. 11 and 12 may be provided by logic gates, which improves the reading speed of the YMUX 106 via the first parallel branch 120.

The programming, erasing, and reading of selected bit cells 104 associated with the remaining bitlines BL<8:127> may be provided in a manner similar to that described above with regard to bitlines BL<7:0>, albeit with different combinations of voltages applied to the FETs in the YMUX 106. However, in each case, the programming of a given bitcell 104 is provided via a conductive NFET path formed within the first parallel branch 120 of the YMUX 106, while the program inhibiting of unselected bitlines in the YMUX 106 is provided via a conductive PFET path formed within the second parallel branch 122 of the YMUX 106. Further, in each case, the erasure of a given bitcell 104 is provided via a conductive PFET path formed within the second parallel branch 122 of the YMUX 106, while the erase inhibiting of unselected bitlines in the YMUX 106 is provided via a conductive NFET path formed within the first parallel branch 120 of the YMUX 106.

According to embodiments of the disclosure, all of the NFETs MN0-MN6 and PFETs MP0-MP4 in the YMUX 106 are low voltage (e.g., 1.8 V) devices. Examining the various voltages applied to each of the NFETs MN0-MN6 and PFETs MP0-MP4 in the YMUX 106, it is clear that none of the NFETs MN0-MN6 and PFETs MP0-MP4 operates outside of its VGS, VDS, and VGD SOA limit (e.g., typically 1.98 V for 1.8 V devices), even though a high voltage (e.g., 3.6 V) is provided by the YMUX 106 during read and erase modes. Further, by including only low voltage devices in the YMUX 106, charge pump circuitry and special devices (e.g., LDMOSFETs), which consume power/area, are no longer required. During the erase mode, the full power supply voltage VWR (e.g., 3.6 V) is provided to the selected bitline by the YMUX 106 as illustrated in FIG. 8. Similarly, during program inhibit, the full power supply voltage VWR is provided to the unselected bitlines by the YMUX 106 as illustrated in FIG. 6. As a result, there is low leakage current through the bitcells 106 associated with the unselected bitlines.

The YMUX 106 described herein may be formed on an integrated circuit chip. The resulting integrated circuit chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A multiplexing circuit for a memory, comprising:
a first parallel branch for coupling a program voltage to a first bitline corresponding to a first bit cell of the memory during a program mode of the memory; and
a second parallel branch for coupling a program inhibit voltage to a plurality of additional bitlines corresponding to a plurality of additional bit cells of the memory during a program inhibit mode of the memory,
wherein the first parallel branch further couples an erase inhibit voltage to the plurality of additional bitlines during an erase inhibit mode of the memory, and
wherein the second parallel branch further couples an erase voltage to the first bitline during an erase mode of the memory.

2. The multiplexing circuit according to claim 1, wherein the memory comprises a resistive random access memory (RRAM).

3. The multiplexing circuit according to claim 1, wherein the multiplexing circuit comprises a column multiplexor.

4. The multiplexing circuit according to claim 1, wherein the second parallel branch is decoupled from the first bitline during the program mode of the memory, and wherein the first parallel branch is decoupled from the first bitline during the erase mode of the memory.

5. The multiplexing circuit according to claim 1, wherein the first parallel branch includes a plurality of N-type field effect transistors (NFETs) for creating a conductive NFET path from an input/output (IO) voltage to the first bitline during the program mode.

6. The multiplexing circuit according to claim 1, wherein the first parallel branch further includes a plurality of NFETs for creating a conductive NFET path from an erase inhibit voltage to the plurality of additional bitlines during the erase inhibit mode.

7. The multiplexing circuit according to claim 6, wherein the plurality of NFETs in the first parallel branch create a conductive NFET path from a sense amplifier to the first bitline during a read mode.

8. The multiplexing circuit according to claim 1, wherein the second parallel branch includes a plurality of FETs for creating a conductive FET path from an IO erase voltage to the first bitline during the erase mode.

9. The multiplexing circuit according to claim 1, wherein the second parallel branch includes a plurality of FETs for creating a conductive FET path from a program inhibit voltage to the plurality of additional bitlines during the program inhibit mode.

10. The multiplexing circuit according to claim 1, wherein the first and second branches include a plurality of low power FETs, and wherein all of the low power FETs operate within their safe operating area.

11. A multiplexing circuit for a memory, comprising:
a first parallel branch including a plurality of N-type field effect transistors (NFETs), wherein the first parallel branch:
couples a program voltage to a bitline corresponding to a bit cell of the memory during a program mode of the memory; and
couples a sense amplifier to the bitline during a read mode of the memory; and
a second parallel branch coupling an erase voltage to the bitline during an erase mode of the memory, wherein the second parallel branch includes a plurality of NFETs and a plurality of P-type FETs (PFETs).

12. The multiplexing circuit according to claim 11, wherein the memory comprises a resistive random access memory (RRAM).

13. The multiplexing circuit according to claim 11, wherein the plurality of NFETs in the first parallel branch include: a first NFET, a second NFET, a third NFET, a fourth NFET, and a fifth NFET, and wherein:
a drain of the first NFET is coupled to the bitline;
a source of the first NFET is coupled to the drain of the second NFET and the drain of the fourth NFET;
a source of the second NFET is coupled to the drain of the third NFET and a drain of the fifth NFET;
a source of the third NFET is coupled to an input/output (IO) voltage; and
a source of the fourth NFET is coupled to a drain of the fifth NFET and a power supply voltage.

14. The multiplexing circuit according to claim 12, wherein:
a gate of the first NFET is coupled to a protection voltage;
a gate of the second NFET is coupled to a first voltage;
a gate of the third NFET is coupled to a second voltage;
a gate of the fourth NFET is coupled to an inverse of the first voltage;
a gate of the fifth NFET is coupled to an inverse of the second voltage.

15. The multiplexing circuit according to claim 11, wherein the plurality of PFETs in the second parallel branch include a first PFET, a second PFET, a third PFET, a fourth PFET, and a fifth PFET, wherein the plurality of NFETs in the second parallel branch include a sixth NFET and a seventh NFET,
and wherein:
a source of the first PFET is coupled to the bitline;
a drain of the first PFET is coupled to the source of the second PFET, the source of the fourth PFET, and the drain of the sixth NFET;
a drain of the second PFET is coupled to the source of the third PFET, a source of the fifth PFET, and a drain of the seventh NFET;
a drain of the third PFET is coupled to an erase voltage; and
a drain of the fourth PFET is coupled to a source of the sixth NFET, a drain of the fifth PFET, a source of the seventh NFET, and a power supply voltage.

16. The multiplexing circuit according to claim 15, wherein:
a gate of the first PFET is coupled to a protection voltage;

a gate of the second PFET and a gate of the sixth NFET are coupled to a first voltage;

a gate of the third PFET and a gate of the seventh NFET are coupled to a second voltage;

a gate of the fourth PFET is coupled to an inverse of the first voltage; and a gate of the third PFET is coupled to an inverse of the second voltage.

17. The multiplexing circuit according to claim 11, wherein the first and second branches include a plurality of low power FETs, and wherein all of the low power FETs operate within their safe operating area.

* * * * *